United States Patent Office 3,282,919
Patented Nov. 1, 1966

3,282,919
PROCESS FOR PREPARING OROTIDINE
William Vincent Curran and Robert Bruce Angier, Pearl River, N.Y., assignors to American Cyanamid Company, Stamford, Conn., a corporation of Maine
No Drawing. Filed Feb. 6, 1964, Ser. No. 343,149
1 Claim. (Cl. 260—211.5)

This invention relates to a novel method for the preparation of orotidine. More specifically, this invention provides a process for the chemical synthesis of orotidine which constitutes a confirmation of the assigned chemical structure of orotidine.

Orotidine is a naturally occurring nucleoside which was first isolated from a fermentation mash of a mutant strain of the fungus Neurospora crassa by A. M. Michelson et al., Proc. Natl. Acad. Sci. 37, 396 (1951). Whereas orotidine was previously obtained by microbiological fermentation, the novel method of the present invention enables chemical synthesis of this naturally occurring nucleoside. Orotidine is an article of commerce and is of interest in biochemical research.

The steps involved in the novel process of the present invention may be depicted as follows:

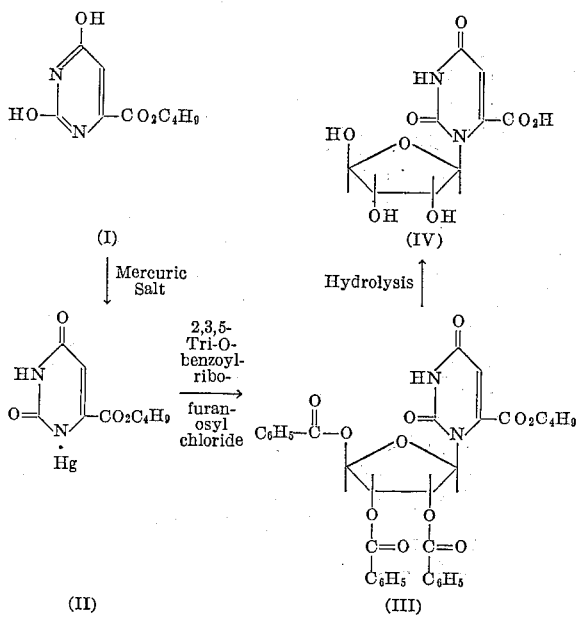

The starting material for the novel process of the present invention is the n-butyl ester of orotic acid (I) which is converted to its monomercury derivative (II) by treatment with a mercuric salt such as mercuric chloride, mercuric bromide, mercuric acetate, mercuric nitrate, etc. This conversion is conveniently carried out in aqueous alcohol in one of two ways. Either an ethanolic solution of the mercuric salt is added, with stirring, to the n-butyl orotate in a solution of aqueous base (such as KOH or NaOH) at room temperature; or a hot aqueous solution of n-butyl orotate is added to a boiling methanolic solution of the mercuric salt. In either case, a precipitate of the monomercury derivative of the n-butyl ester of orotic acid forms immediately, which is removed by filtration and dried.

The monomercury derivative of n-butyl orotate (II) is then converted to the tribenzoyl n-butyl ester of orotidine (III) by condensation with 2,3,5-tri-O-benzoylribofuranosyl chloride in an inert solvent such as benzene, toluene, xylene, and the like. This condensation is carried out at the reflux temperature of the solvent for a period of time of from about 1 hour to 5 hours or more.

The reaction mixture is then filtered and the filtrate is diluted with a hydrocarbon solvent such as petroleum ether or VMP naphtha whereupon the tribenzoyl n-butyl ester of orotidine precipitates as a viscous syrup.

The hydrolysis of the tribenzoyl n-butyl ester of orotidine (III) is conveniently carried out in a solution of sodium methoxide in methanol over a period of several hours at room temperature, followed by treatment with aqueous base. Separation of the orotidine (IV) is accomplished by gradient-elution ion-exchange chromatography and charcoal adsorption. The orotidine (IV) may be converted to its salt form with an organic base such as, for example, trimethylamine, cyclohexylamine, etc., which may then be obtained in crystalline form by standard crystallization techniques.

The invention will be described in greater detail in conjunction with the following specific examples.

EXAMPLE 1.—PREPARATION OF n-BUTYL OROTATE MERCURY

Method A n-Butyl orotate (10 g., 0.047 mole) was added to 3.0 liters of water and stirred vigorously. Fifty ml. of 1 N sodium hydroxide was added, stirred for about 3 minutes and filtered to remove undissolved n-butyl orotate (0.35 g.). To the filtrate was added, with stirring, 13.0 g. (0.047 mole) of mercuric chloride dissolved in 100 ml. of ethanol. A white, flocculent precipitate came out almost immediately. The suspension was stirred for 10 minutes, warmed to 50° C., then allowed to stand at room temperature overnight. The product was filtered, washed with water until free from chloride ion, and dried over phosphorus pentoxide in vacuo; yield 7.75 g. (40%).

Method B

Mercuric acetate (3.2 g., 10 mmoles) was dissolved in 60 ml. of boiling methanol. To this solution was added a hot solution of 2.1 g. (10 mmoles) of n-butyl orotate in 100 ml. of water. A white flocculent precipitate formed immediately; yield 3.85 g. (94%).

EXAMPLE 2.—PREPARATION OF OROTIDINE CYCLOHEXYLAMMONIUM SALT

A. Condensation reaction.—n-Butyl orotate mercury (6.2 g., 15 mmoles) was ground to a fine powder and added to 250 ml. of xylene. The mixture was azeotropically dried by distilling 80 ml. of solvent using a Dean-Stark trap. To the hot, stirred mixture was added 2,3,5-tri-O-benzoylribofuranosyl chloride [prepared from 15 g. (29.8 mmoles), of 1-acetyl-2,3,5-tri-O-benzoylribofuranose] dissolved in 120 ml. of xylene. The solution was refluxed for three hours with 120 ml. of xylene being removed by distillation at the beginning of this period. A white solid precipitated on cooling; yield 2.26 g. This material was an impure mercury derivative of n-butyl orotate.

The filtrate was poured into 3 liters of petroleum ether (B.P. 30°–60° C.) to give a thick gum. After having been chilled for several hours the solution deposited a crystalline precipitate. The flask was swirled several times and allowed to stand in the cold for two days. The crystals were decanted from the gum and dried; yield 3.0 g., M.P. 117°–123° C. This material did not contain nitrogen and was not further investigated. The residual gum was dissolved in 250 ml. of ethyl acetate and extracted with three 100 ml.-portions of 30% aqueous potassium iodide solution followed by two 100 ml.-portions of water. After having been dried over magnesium sulfate the ethyl acetate was removed in vacuo on a water bath to give a syrup; yield 10.59 g.

B. Deblocking.—The above syrup was added to 1500 ml. of anhydrous methanol containing 4.0 g. of sodium methoxide. The mixture was protected with a tube of Drierite (anhydrous calcium sulfate) and stirred for several hours, then allowed to stand at room temperature overnight. A small amount of insoluble material was collected and discarded. The filtrate was neutralized to pH 5 with Dowex 50 W-X4 which had previously been washed with water and methanol; the resin was filtered off and the filtrate evaporated to an oil in vacuo. The oil was slurried in 100 ml. of water and extracted with three 100 ml.-portions of ether to remove methyl benzoate. Paper chromatography of the aqueous layer in n-propanol-water (3:1) showed four ultraviolet absorbing spots, two of which traveled close to orotidine and orotic acid (ca. $R_f$ 0.25 and 0.30) and the other two at ca. $R_f$ 0.70 and 0.75. On treatment with base both of the higher $R_f$ spots disappeared indicating they were being converted to the lower $R_f$ compounds.

The aqueous layer was evaporated to 22 ml. in vacuo, cooled to room temperature, and 25 ml. of 1 N sodium hydroxide added to give a turbid solution. The turbidity disappeared after 10–15 minutes of stirring. After having been stirred for one hour (pH 13.4) the solution was treated with a small amount of Norit (an activated charcoal), stirred for an additional 5 minutes and filtered through a pad of Celite (a diatomaceous earth). The filtrate was acidified to pH 5 with 1.0 ml. of acetic acid and allowed to stand at room temperature overnight. Some crystals came out which were collected and dried after several hours in the cold; yield 136 mg., 250 m$\mu$/260 m$\mu$=0.61, 280 m$\mu$/260 m$\mu$=1.8 in 0.1 N HCl. These values are in good agreement with those published for orotic acid.

The filtrate from this product was evaporated in vacuo on a water-bath to 12–15 ml. and chilled overnight. A small crop (6 mg.) of crystals was filtered off and discarded. The filtrate was adjusted to 100 ml. with water and treated as described below.

C. *Gradient elution chromatography.*—Eighty-five ml. of the above solution was added to 500 ml. of water and brought to pH 10.5 with concentrated ammonium hydroxide. This solution was applied to a Dowex 1-X8 (Cl) column (4 x 11.5 cm., 200–400 mesh) and washed with 2 liters of water. The column was then eluted with a linear 0.1 M ammonium bicarbonate gradient. Four hundred fractions were collected. However, the size of the fractions varied from about 70 to 85 ml. since the fraction collector operated on a time basis. The progress of the column was followed by reading the optical densities of the fractions at 260 and 280 m$\mu$.

The main orotidine-containing fractions (#135 to 168), as determined by U.V. were combined and evaporated to dryness in vacuo at 70°–75° C. The residue was dissolved in a 100 ml.-portion of water and evaporated until a constant weight was obtained; yield 1.07 g. This material traveled as a single spot alongside authentic orotidine in isopropanol-1 N ammonium hydroxide (7:3), n-butanol-formic acid-water (77:10:13), and isopropanol-concentrated hydrochloric acid-water (17:4:4). This product gave a positive test for chloride ion, therefore, it was treated as described below.

D. *Charcoal adsorption.*—The 1.07 g. of crude product was dissolved in 250 ml. of water and adjusted to pH 2.5–3.0 with 1 N hydrochloric acid. The volume was brought to 300 ml. and 100 ml. of a 4% suspension of acid-washed Norit A was added with stirring. Additional amounts (25 ml. and 50 ml. of the 4% suspension and 1.0 g. of acid-washed Norit A) were added after one, two and three hours. After a total of four hours approximately 90% of the orotidine had been adsorbed as judged by reading the optical density at 260 m$\mu$. The Norit was filtered off and stirred in 500 ml. of 0.3% ammonia in ethanol-water (1:1) for thirty minutes, then filtered through a pad of Celite. The Norit-Celite mixture was extracted three more times with 500 ml. portions of the alcoholic-ammonia solution, the last one being heated on a steambath. The combined extracts were evaporated to dryness in vacuo at 70°–75° C. and the residue dissolved in 500 ml. of water. This solution was passed through a column (25 ml. wet volume, 2 x 6 cm.) of Dowex 50W–X4 (cyclohexylammonium form) and washed with 200 ml. of water. The eluate was evaporated to dryness in vacuo, extracted with water and filtered from a small amount of insoluble material, and again evaporated to dryness in vacuo; yield 591 mg. This product was dissolved in 15 ml. of absolute ethanol, treated with a very small amount of Norit and filtered through a pad of Celite. The Celite was washed with three 5 ml. portions of ethanol. The combined filtrate and washings were evaporated to 10 ml. and filtered to remove a small amount of amorphous material. Five ml. of ethanol followed by 10 ml. of ethyl acetate was added to the filtrate. This mixture stood at room temperature for two days and deposited a small amount of a white solid which was filtered off and discarded. Ethyl acetate was added to the filtrate to incipient turbidity and seeded with orotidine cyclohexylamine salt. Very little crystallization occurred after twenty-four hours. About 60–70 ml. of ethyl acetate was added to precipitate a thick syrup and the mixture was brought to boiling. The syrup crystallized on cooling; yield 345 mg., M.P. 173°–174.5° C. dec. Recrystallization from ethanol-ethyl acetate afforded 284 mg., M.P. 178.5°–180° C. dec. This material was identical to authentic orotidine cyclohexylammonium salt as judged by mixture melting point, paper chromatography, and infrared and ultraviolet absorption spectra.

Additional crops of 94 mg., M.P. 182°–183.5° C. dec., 28 mg., M.P. 178°–179° C. dec., and 68 mg., M.P. 180°–182.5° C. dec. were obtained from various mother liquors. The identity of these materials with the main crop was confirmed by infrared spectroscopy. Thus the total yield of isolated orotidine cyclohexylamminoum salt was 474 mg. However, since only 85 of 100 ml. of the solution of deblocked nucleoside was subjected to gradient elution the actual yield should be 557 mg. Correcting for the amount of n-butyl orotate (4.25 mmoles) recovered as an impure mercury salt and the sodium orotate (0.82 mmole) obtained after deblocking, this amounts to a 14.5% yield.

What is claimed is:

The method of preparing orotidine which comprises reacting n-butyl orotate with a mercuric salt to form the monomercury derivative of n-butyl orotate, reacting said monomercury derivative with 2,3,5-tri-O-benzoylribofuranosyl chloride to form the tribenzoyl n-butyl ester of orotidine of the formula:

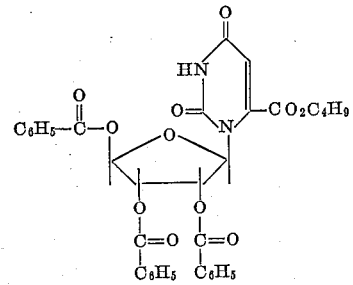

and hydrolyzing said tribenzoyl n-butyl ester to obtain orotidine.

References Cited by the Examiner

UNITED STATES PATENTS

| | | | |
|---|---|---|---|
| 2,795,580 | 6/1957 | Khorana | 260—211.5 |
| 2,885,396 | 5/1959 | Heidelberger et al. | 260—211.5 |
| 3,040,026 | 6/1962 | Duschinsky | 260—211.5 |
| 3,135,737 | 6/1964 | Restivo. | |

LEWIS GOTTS, *Primary Examiner.*

J. R. GENTRY, J. R. BROWN, *Assistant Examiners.*

UNITED STATES PATENT OFFICE
CERTIFICATE OF CORRECTION

Patent No. 3,282,919            November 1, 1966

William Vincent Curran et al.

It is hereby certified that error appears in the above numbered patent requiring correction and that the said Letters Patent should read as corrected below.

Column 1, lines 25 to 50, the reaction scheme should appear as shown below instead of as in the patent:

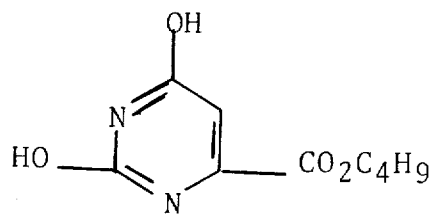

(I)

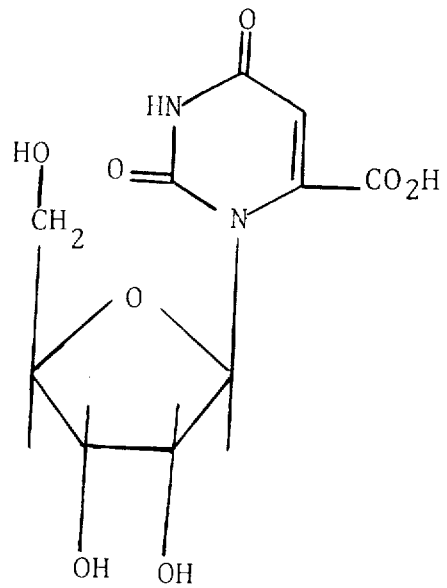

(IV)

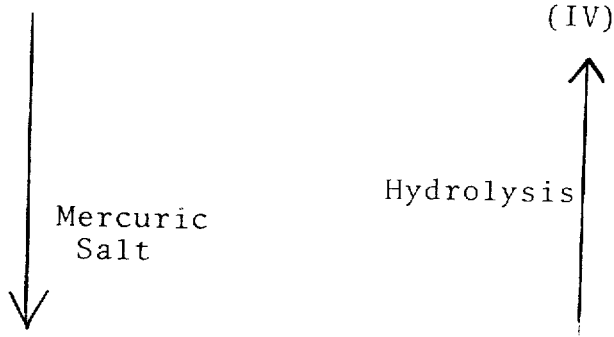

3,282,919
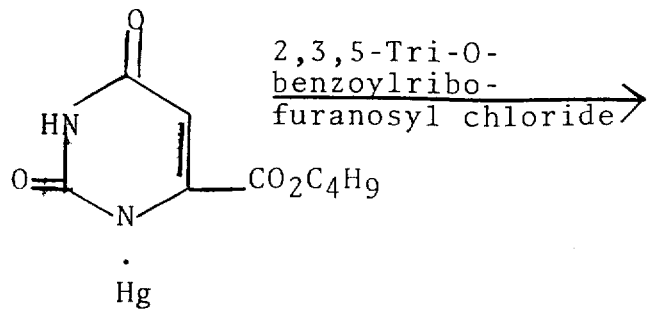
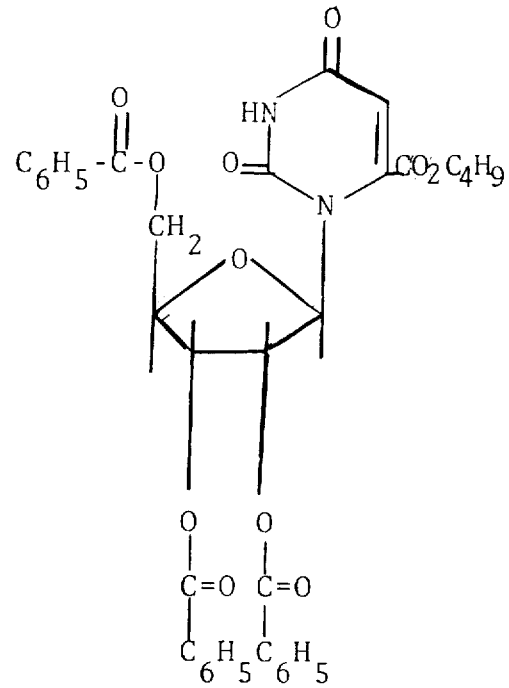
(II)
(III)
column 4, lines 52 to 63, the formula should appear as shown below instead of as in the patent:

3,282,919

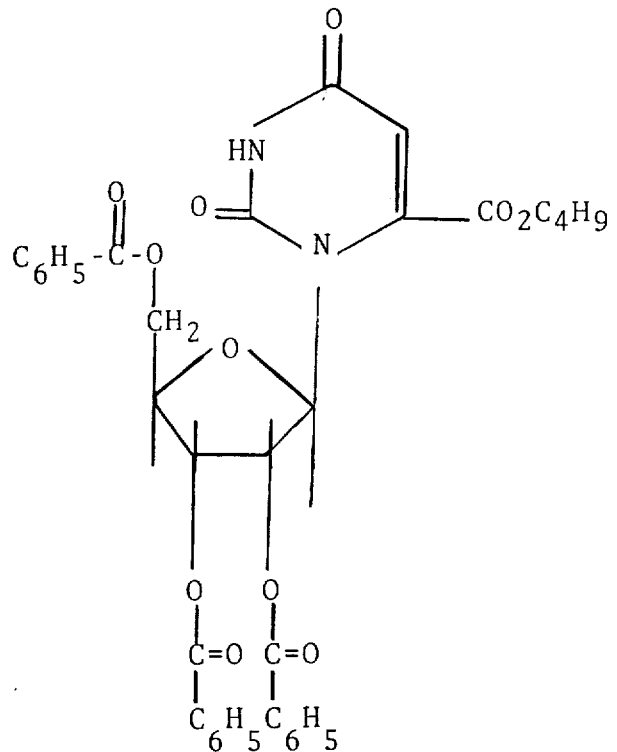

Signed and sealed this 12th day of September 1967.

(SEAL)
Attest:

ERNEST W. SWIDER
Attesting Officer

EDWARD J. BRENNER
Commissioner of Patents